United States Patent
Vogel et al.

(10) Patent No.: US 11,999,053 B2
(45) Date of Patent: Jun. 4, 2024

(54) METHOD FOR DESIGNING AND MACHINING A GEAR WHEEL, AND CORRESPONDING MACHINE TOOL AND SOFTWARE

(71) Applicant: Klingelnberg AG, Zürich (CH)

(72) Inventors: Olaf Vogel, Ettlingen (DE); Thomas Schenk, Coburg (DE)

(73) Assignee: KLINGEINBERG AG, Zurich (CH)

( * ) Notice: Subject to any disclaimer, the term of this patent is extended or adjusted under 35 U.S.C. 154(b) by 1299 days.

(21) Appl. No.: 16/483,794

(22) PCT Filed: Jan. 11, 2018

(86) PCT No.: PCT/EP2018/050617
§ 371 (c)(1),
(2) Date: Aug. 6, 2019

(87) PCT Pub. No.: WO2018/149565
PCT Pub. Date: Aug. 23, 2018

(65) Prior Publication Data
US 2019/0391555 A1    Dec. 26, 2019

(30) Foreign Application Priority Data
Feb. 16, 2017  (DE) ............... 10 2017 103 115.4

(51) Int. Cl.
*B25J 15/00*   (2006.01)
*B23F 23/06*   (2006.01)
(Continued)

(52) U.S. Cl.
CPC ....... *B25J 15/0028* (2013.01); *B25J 11/0055* (2013.01); *B25J 15/0033* (2013.01);
(Continued)

(58) Field of Classification Search
None
See application file for complete search history.

(56) References Cited

U.S. PATENT DOCUMENTS

2002/0183877 A1   12/2002   Rameau et al.
2005/0154481 A1    7/2005   Berger et al.
(Continued)

FOREIGN PATENT DOCUMENTS

CN    101518840 A    9/2009
DE    102007016056 A1   10/2008
(Continued)

OTHER PUBLICATIONS

German Search Report for German Patent Application No. DE 102017103115.4, dated Dec. 6, 2017, 2 pages.
(Continued)

*Primary Examiner* — Ryan A Jarrett
(74) *Attorney, Agent, or Firm* — McCarter & English, LLP (57) ABSTRACT

Method comprising:
designing a gear in a software-based computer-aided manner in order to obtain a function-oriented geometry,
using a software-based computer-aided method for ascertaining a theoretically producible gear geometry corresponding to or an approximation of the function-oriented geometry,
providing production data representing the theoretically producible geometry,
machining a gear using the production data in a CNC-controlled processing machine,
measuring the gear to obtain an actual data set of the gear,
carrying out a comparison of the actual data set with the production data in order to ascertain at least one correction variable,
(Continued)

using the correction variable in order to ascertain corrected production data from the production data or carry out a machining correction in the processing machine, and post-machining the gear using the machining correction or using the corrected production data in order to machine at least one additional gear in the processing machine.

13 Claims, 3 Drawing Sheets

(51) Int. Cl.
    *B25J 11/00*         (2006.01)
    *G05B 19/18*         (2006.01)
    *G05B 19/4069*     (2006.01)
    *G05B 19/4093*     (2006.01)

(52) U.S. Cl.
    CPC ....... *G05B 19/186* (2013.01); *G05B 19/4069* (2013.01); *G05B 19/4093* (2013.01); *B23F 23/06* (2013.01); *G05B 2219/35028* (2013.01); *G05B 2219/35193* (2013.01); *Y10S 901/39* (2013.01)

(56) References Cited

U.S. PATENT DOCUMENTS

| | | | |
|---|---|---|---|
| 2005/0159938 A1 | 7/2005 | Shigemi et al. | |
| 2006/0285936 A1* | 12/2006 | Muller | B23F 5/20 |
| | | | 409/51 |

FOREIGN PATENT DOCUMENTS

| | | |
|---|---|---|
| DE | 102009008121 A1 | 8/2010 |
| DE | 102012201732 A1 | 8/2013 |
| EP | 2221693 A2 | 8/2010 |
| EP | 2363238 A2 | 9/2011 |
| EP | 2492766 A1 | 8/2012 |
| EP | 2520390 A1 | 11/2012 |
| EP | 3034221 A1 | 6/2016 |
| JP | 2000-108028 A | 4/2000 |
| JP | 2001-216010 A | 8/2001 |
| JP | 2002-334122 A | 11/2002 |
| JP | 2004-086773 A | 3/2004 |
| JP | 2005-326997 A | 11/2005 |
| WO | 2007012351 A1 | 2/2007 |

OTHER PUBLICATIONS

Humpa, "CAD-Methodik zur Produktivitätssteigerung in der Prozesskette Konstruktion-Fertigung," Dec. 19, 2016, pp. FP-149.
International Search Report for Application No. PCT/EP2018/050617, dated May 4, 2018, 4 pages.
Written Opinion for Application No. PCT/EP2018/050617, dated May 4, 2018, 7 pages.

* cited by examiner

METHOD FOR DESIGNING AND MACHINING A GEAR WHEEL, AND CORRESPONDING MACHINE TOOL AND SOFTWARE

CROSS-REFERENCE TO RELATED APPLICATIONS

This application is a national stage application of international application no. PCT/EP2018/050617 filed Jan. 11, 2018, entitled "Method for Designing and Machining a Gear, and Corresponding Processing Machine and Software," claiming priority to German application no. DE 10 2017 103 115.4, filed Feb. 16, 2017, which are hereby expressly incorporated by reference as part of the present disclosure.

FIELD OF THE INVENTION

The present disclosure generally relates to a method for the automated design and machining of gear wheels. The present disclosure also relates to a corresponding machine tool and software.

BACKGROUND

There are numerous computation, machining, and documentation steps between the first design of a gear wheel or wheelset pair and the finished installed wheelset.

The production of a gear wheel typically begins with the computer design, which is carried out on the basis of specifications of, for example, a client. There are greatly varying approaches here, which finally all provide a target data set or a neutral data set. This data set is then typically loaded into a machine tool. The machine tool converts the data set into machine data and the machining of a gear wheel workpiece is carried out on the basis of the machine data. If the gear wheel thus produced does not correspond to the original design, corrections are thus performed on the method and a further gear wheel is produced.

The current production and machining sequences are becoming more and more complex and the requirements in the matter of accuracy are increasing. Moreover, efforts are taken above all for the single part or small series production to produce no or only few discards.

SUMMARY

It is an objective to provide a robust method which enables a gear wheel or wheelset to be designed and produced according to the design reliably and efficiently.

Software or a software module are designed to execute the method on a computer. Such a software module can be, for example, part of a modular program system for user-friendly application on the computer platform of the client.

The method in some aspects is a software-based, computer-assisted method, which operates substantially autonomously.

However, the method can also incorporate a user in at least some embodiments insofar as the user can, for example, perform inputs on a display screen and/or can influence a selection of tools.

A design method (also called dimensioning phase or design phase) is capable of specifying a function-oriented geometry of a gear wheel to be produced or of a wheelset. Only a single gear wheel Z is mentioned hereafter, wherein the method may also be applied to wheelsets. The design method may be a solely theoretical, mathematical definition of the gear wheel with or without modifications. This design may be carried out using client specifications.

Moreover, a method for defining a theoretically producible geometry of the gear wheel proceeds from the function-oriented geometry or builds on the function-oriented geometry.

The definition of the theoretically producible geometry is performed in at least some embodiments in consideration of the available machine tools and/or the available tools or tool systems (for example, cutterheads which can be equipped with different bar cutters).

The method may involve separate handling of design-relevant (theoretical) aspects and production-relevant, kinematic (practical) aspects.

The production (machining) of at least one gear wheel is then performed on the basis of target data or neutral data (referred to here in general as production data), which were transferred to the machine tool. The target data were derived or ascertained beforehand from the definition of the theoretically producible geometry of the gear wheel.

After the production of the at least one gear wheel, a measurement of the gear wheel is performed, wherein actual data are ascertained, which are subsequently compared to the target data.

In this manner, at least one correction variable may be ascertained, which can then be used to engage in the machine tool and/or compute adapted production data. These adapted production data can then be used, for example, for the production of a further gear wheel (for example, of a small series).

One such method comprises multiple method modules or processes, which are interleaved and/or build on one another, to thus form a robust functioning process chain from the design to the production, which enables high-quality gear wheels to be manufactured.

At least some embodiments are based on the targeted selection of a suitable tool and on the definition of suitable machine kinematics of a multi-axis, CNC-controlled machine tool for machining a gear wheel. The machine kinematics may be ascertained in the scope of a computer-based production and/or machining simulation.

The software-based, computer-assisted method for ascertaining a theoretically producible geometry of the gear wheel may be used so that it takes into consideration kinematic aspects of both a tool and also a machine tool. For example, in at least some embodiments, all kinematic relationships are ascertained here.

At least some embodiments are based on the use of already existing tools, instead of using modified tools or even having to modify tools.

Already existing tools can extensively be used. If these are dressable grinding tools, a standard dressing method can be applied to dress existing tools. In contrast to the prior art, neither modified tools nor corresponding modified dressing methods are thus used here.

At least one method enables, inter alia, the production of gear wheels having a gear tooth geometry and/or surface structure of the tooth flanks (in the sense of the topology of the tooth lines), which extensively corresponds to the original design. The method enables the selection of a suitable tool for use in a suitable machine tool, to produce a gear wheel having a gear tooth geometry and/or surface structure which is as close as possible to the function-oriented geometry which was defined in the scope of a design.

According to at least some embodiments, modifications of the tooth flanks (for example, flank crowning, end relief, and the like) can be specified during the design, i.e., during the ascertainment of a function-oriented geometry, which can be necessary, for example, to pair the gear wheel with another gear wheel in a desired manner as a wheelset pair. The method helps in this case to specify the most efficient possible path for the production of such a gear wheel, wherein a gear wheel is always produced, however, which is to be considered a best possible approximation of the theoretically specified gear wheel. This is because the theoretically producible geometry of the gear wheel, which is used to provide the production data, differs from the function-oriented geometry, and the actual data on the produced gear wheel in turn deviate from the production data.

A method path may be found which robustly and reliably enables the production/machining of a gear wheel, which corresponds as much as possible within narrow tolerances to the function-oriented geometry.

CNC machine tools, which have at least 5 CNC-controlled axes, may be used. For example, the method may be applied in the milling (for example, in diagonal generating milling), peeling (for example, in hob peeling), or grinding (for example, in diagonal generating grinding) of gear wheels.

Both single indexing methods and continuous indexing methods may be used.

A CNC-controlled machine tool designed as a neutral data machine may be used.

The method may be used, for example, in conjunction with a generating grinding machine according to EP3034221 A1, a hob peeling machine according to EP2520390 A1, or a universal machine according to WO2007012351 A1.

The software and/or the computer, on which the software is installed, for example, may have an interface to the machine tool, and/or the software is installable on a machine tool.

For example, a machine tool is adapted for use by the software in this case.

At least some embodiments may be used in a manufacturing environment which, in addition to the CNC-controlled machine tool and a precision measuring device, comprises, for example, a tool station (possibly having tool setting device).

At least some embodiments enable the rapid and targeted development of gear wheels or wheelsets, and the directly following production.

At least some embodiments enable a high quality level to be ensured and the rejection rate to be kept low. In addition, the approach is robust and thus guarantees high process reliability.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Exemplary embodiments, which are understood not to be limiting, are described in greater detail hereafter with reference to the drawings.

DETAILED DESCRIPTION

Terms are used in conjunction with the present description which are also used in relevant publications and patents. However, it is to be noted that the use of these terms is merely to serve for better comprehension. The inventive concepts and the scope of protection of the claims for protection are not to be restricted in the interpretation by the specific selection of the terms. The invention may be readily transferred to other term systems and/or technical fields. The terms are to be applied accordingly in other technical fields.

Figure 1A:
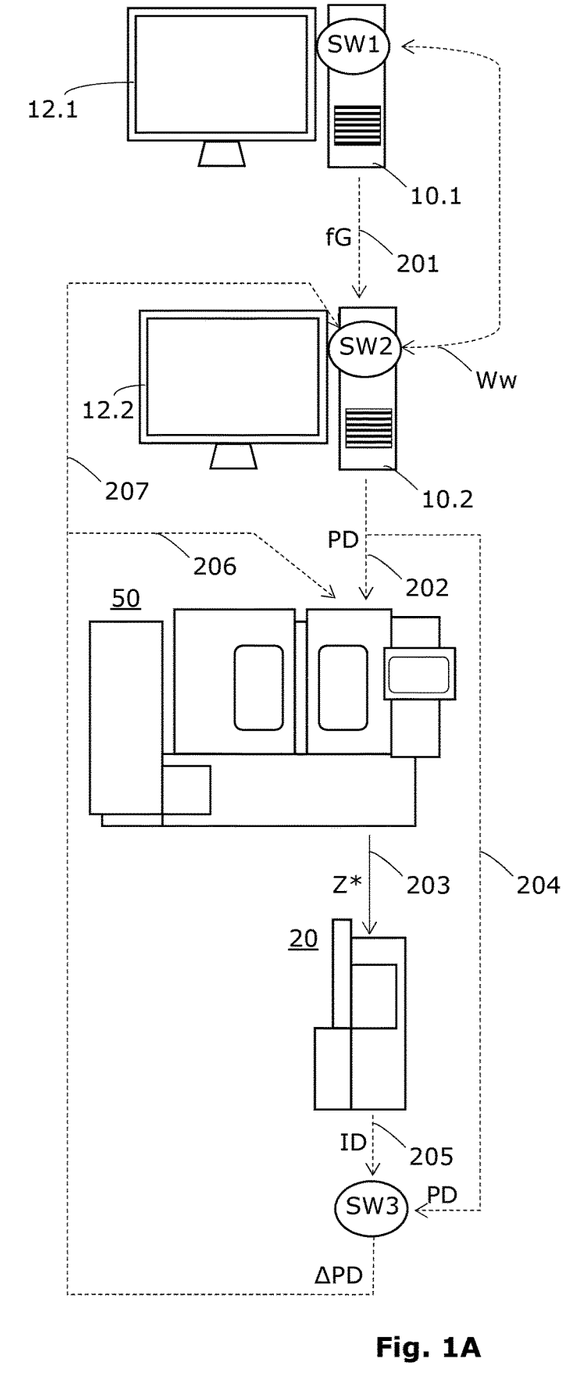
FIG. 1A is a schematic view of a method for designing and machining/producing a gear wheel and/or a wheelset.
Figure 1B:
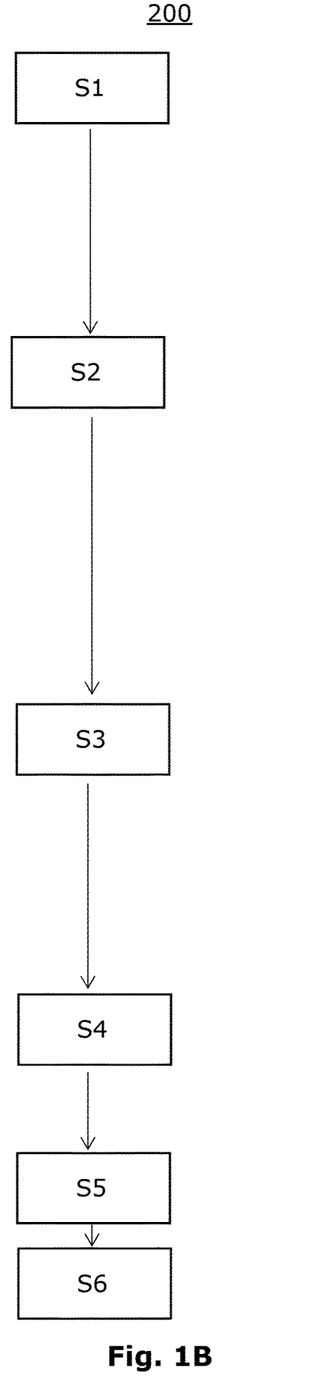
FIG. 1B shows the flow chart of the method in a parallel schematic view.

This disclosure relates to methods for designing and machining and/or producing a gear wheel Z, which comprises multiple interleaved partial steps or processes. Aspects are firstly described in conjunction with FIGS. 1A and 1B. FIG. 1A shows a schematic diagram of the machining of a gear wheel Z. To be precise, the method can proceed from a blank or a gear wheel workpiece. However, a gear wheel Z is always referred to hereafter so as not to complicate the description, but is meant to also refer to blanks or gear wheel workpieces. A schematic flow chart is shown in a parallel illustration in FIG. 1B, which shows steps in the form of individual (method) blocks.

In a first step S1, the software-based, computer-assisted design of a gear wheel Z to be produced is performed. The goal of step S1 is the provision of a function-oriented geometry fG of the gear wheel Z. It is indicated in FIG. 1A that step S1 can be executed or assisted, for example, by software SW1, which is installed and executed, for example, in a computer 10.1 having display screen 12.1.

In FIG. 1A, it is symbolized by an arrow 201 that the function-oriented geometry fG is transferred to next step S2 (for example, to software SW2).

In a second step S2, the software-based, computer-assisted ascertainment of a theoretically producible geometry thG of this gear wheel Z is performed. Second step S2 proceeds from the provided function-oriented geometry fG.

The goal of step S2 is the provision of a geometry thG, which corresponds to the function-oriented geometry fG or is to be considered an approximation of the function-oriented geometry fG. In general, there will be a difference between the function-oriented geometry fG and the theoretically producible geometry thG. FIG. 1A indicates that step S2 can be executed or assisted, for example, by software SW2, which is installed and executed, for example, in a computer 10.2 having display screen 12.2.

Steps S1 and S2 can also be executed in at least some embodiments, however, on the same computer 10, in a computer network, and/or using the same software SW. The software SW may comprise two correspondingly designed software modules SW1 and SW2 in this case.

As a result of second step S2, production data PD can be provided and transferred, for example, to a machine tool 50, as symbolized in FIG. 1A by an arrow 202. These production data PD represent the theoretically producible geometry thG. I.e., the theoretically producible geometry thG is comprised in these production data PD or is depicted by the production data PD.

The production data PD can also comprise in at least some embodiments, in addition to the theoretically producible geometry thG:
- the tool data,
- the machine kinematic (including required dressing kinematic),
- the target measurement data.

The term "production data PD" is used here to take into consideration the fact that depending on the provider of the software, producer of the machine tool 50, and depending on the user, different data sets and/or standards are used for communication purposes. The production data PD may be target data or neutral data.

In a further step S3, the actual machining of a gear wheel in the machine tool 50 is now performed. As a result, the machine tool 50 provides a gear wheel, which is identified here by the reference sign Z*, since there can be deviations between the gear wheel Z, which was originally planned to be produced, and the presently produced gear wheel Z* (for example, because of manufacturing inaccuracies). A CNC-controlled machine tool 50 may be used in this step.

In a further step S4, the gear wheel Z* is now subjected to a measurement, which is carried out in the machine tool 50 or, for example, in a separate measuring machine 20. Such a separate measuring machine 20 is shown by way of example in FIG. 1A. The transfer of the gear wheel Z* is symbolized by an arrow 203 in FIG. 1A.

Measuring the gear wheel Z* provides an actual data set ID.

In a further step S5, the production data PD are related to the actual data set ID. A comparison of individual production data PD to individual data of the actual data set ID may take place to cover deviations and to ascertain at least one correction variable ΔPD therefrom.

In FIG. 1A the relation of the production data PD to the actual data set ID is carried out by software SW3. For this purpose, the production data (see arrow 204) and the actual data set ID (see arrow 205) are transferred to this software SW3.

In a further step S6, the correction variable(s) ΔPD is/are used either to engage in the machine tool 50 (see arrow 206) or to ascertain corrected production data kPD (see arrow 207).

The engagement in the machine tool 50 can be carried out, for example, so that the machine tool 50 can perform corrections when finish machining the same gear wheel Z*, or the machining takes place from the beginning in corrected form during the machining of a following further gear wheel.

If corrected production data kPD are to be ascertained, this can take place, for example, by the (renewed) use of the software SW2, as FIG. 1A indicates. In this case, the corrected production data kPD are transferred via the connection 202 to the machine tool 50 and the machining of at least one further gear wheel takes place therein.

Further details of the method will be described hereafter and further embodiments will be explained.

Step S1 is a design method, which is capable of specifying a function-oriented geometry fG of a gear wheel Z to be produced, or a wheelset. In at least some embodiments, this relates to a solely theoretical, mathematical definition of the gear wheel Z with or without modifications (such modifications are sometimes also referred to as corrections, although this term is not accurate). This design may be carried out in step S1 using input variables, for example, tooth count, diameter and tooth width, spiral and engagement angle, tooth height and tooth head height, tooth thickness, selection of the gear tooth system, axial angle and axial offset for installation of the gear wheels of a wheelset, specifications on the power transfer of the wheelset to be produced, specifications on the transmission ratio, efficiency, noise behavior.

The input variables can be specified, for example, in the form of client specifications KV (for example, in the form of a requirement profile for a wheelset). The use of client specifications KV is shown in FIG. 2 by an input arrow, which points from client specifications KV in the direction of box S1.

Instead of proceeding from client specifications KV, or as a supplement to the client specifications KV, step S1 can also be supplied with the loading of a data set DS (for example, from another development environment). A further optional input arrow from DS into S1 is therefore shown in FIG. 2.

Figure 2:
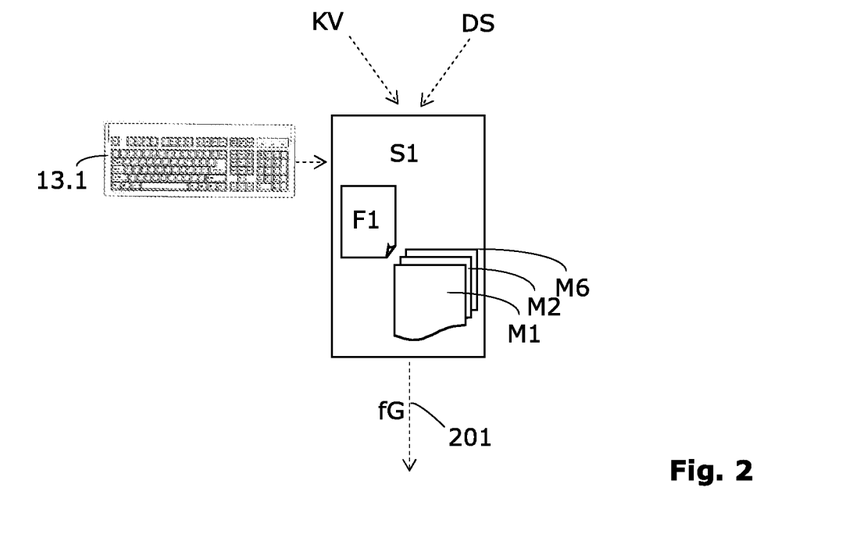
FIG. 2 shows a schematic view of a partial step of the method.

Alternatively or additionally, however, the required input variables can also be input in the system, as indicated in FIG. 2 by an arrow from a keyboard 13.1.

In conjunction with the design, already existing software can be used in step S1, for example, wherein changes and expansions have to be performed to adapt this software to the steps.

Proceeding from input variables, a function-oriented geometry fG of the gear wheel Z or the wheelset, respectively, is ascertained in step S1. Formulas F1 can be stored in the software for this purpose (see FIG. 2), or the formulas or a set of formulas can be loaded.

In the scope of this design, one or more of the following partial steps can also be carried out:
- computer strength analysis (M1);
- ascertainment of tolerances for the production (M2);
- static and/or dynamic observation (M3);
- computer optimization of the microgeometry (for example, by flight modification) (M4);
- tooth contact analysis of the two gear wheels of the gear pair (M5);
- ease off synthesis (M6).

Corresponding software modules M1 to M6 can be used in step S1 in at least some embodiments, as indicated in FIG. 2.

Step S1 can transfer the function-oriented geometry fG, for example, directly to subsequent step S2, as indicated by the arrow 201, or the function-oriented geometry fG can be (temporarily) stored in a (central) database.

In step S2, a method for the definition of a theoretically producible geometry thG of the gear wheel Z proceeds from the function-oriented geometry fG or builds on the function-oriented geometry fG. The goal of this method is the provision of target data or neutral data (referred to herein general as production data PD), which can be transferred directly or indirectly (for example, via a (central) database) to the machine tool 50.

Proceeding from the function-oriented geometry fG, the theoretically producible geometry thG of the gear wheel Z or of the wheelset, respectively, is ascertained in step S2. For this purpose, formulas F2 can be stored in the software (see FIG. 3A), or the formulas or a formula set can be loaded. The theoretically producible geometry thG can be ascertained, for example, via a numeric optimization method, in which the deviations between the theoretically producible geometry thG and the function-oriented geometry fG are minimized or which is applied so that the deviations of the theoretically producible geometry thG from the function-oriented geometry fG are within tolerances.

Figure 3A:
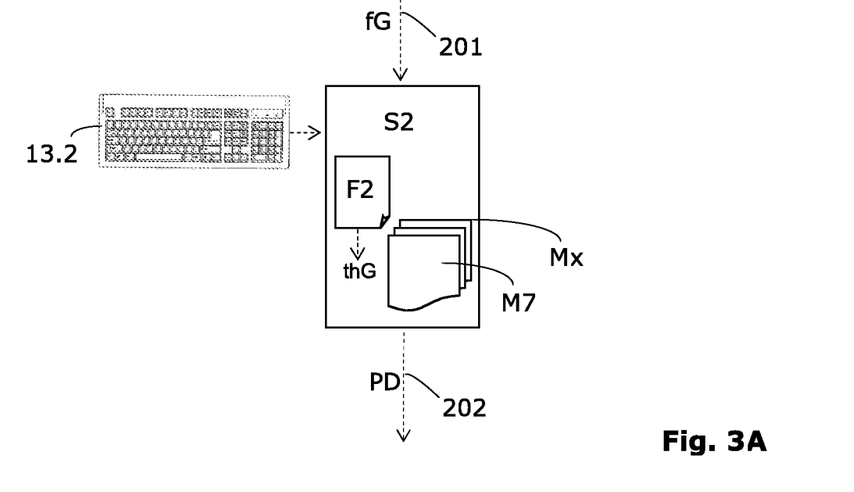
FIG. 3A shows a schematic view of a further partial step of the method.
Figure 3B:
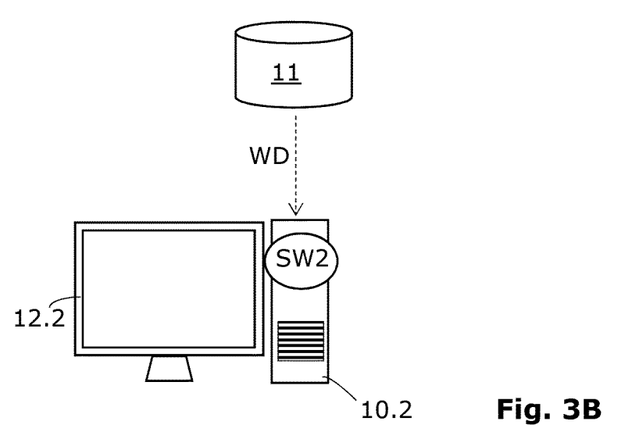
FIG. 3B shows a schematic view of a further partial step of the method.

FIG. 3B indicates that tool data WD can be loaded, for example, from a database 11 in the scope of step S2. This partial step is optional.

Corresponding software modules M7 to Mx may be used in step S2 in at least some embodiments, as indicated in FIG. 3A.

In addition, a manual input of data or a selection may be performed in step S2, as indicated in FIG. 3A, by a keyboard 13.2.

A computer-based machining simulation, for example, in the form of a cutting simulation, may be used in step S2 in at least some embodiments to ascertain the theoretically producible geometry thG of the gear wheel Z.

At the end of the method for the definition of a theoretically producible geometry thG, production data PD are provided and stored and/or transferred to a machine tool 50, as indicated by the arrow 202.

At the end of the method for the definition of a theoretically producible geometry thG, a graphic representation can optionally also be carried out (for example, as an evaluation page) to indicate to the user deviations of the theoretically producible geometry thG in relation to the function-oriented geometry fG.

According to at least some embodiments, production-relevant details (for example, the question of whether a single indexing method or a continuous indexing method is to be applied) are handled during the definition of the theoretically producible geometry thG, since this method step also relates, inter alia, to kinematic aspects. These production-relevant details can be handled or processed, for example, in the form of individual software modules M7 to Mx.

At least some embodiments may comprise at least one CNC-controlled machine tool 50 for the cutting machining of the gear wheel Z.

Such a machine tool 50 can convert, for example, the production data PD into suitable machine data, so that the machining steps and axial movements run in a chronologically and spatially coordinated manner in the machine tool 50. The cutting machining of the gear wheel is summarized as step S3 in FIG. 1B.

At the end of step S3, a gear wheel Z* is transferred directly or indirectly (for example, via a temporary storage) to a measuring device 20 inside the machine tool 50 or to a separate measuring machine 20, as shown in FIG. 1A. This transfer can take place manually, semi-automatically, or fully automatically.

The measuring device 20 or measuring machine 20 is incorporated into the overall concept in at least some embodiments. In at least some embodiments, this can be a fully automated or semi-automatic measuring device 20 or measuring machine 20.

Production data PD for the measurement S4 (for example, for a topography measurement) are input from the database (for example, a central production database). The actual data ID of the gear wheel Z* resulting from the measurement S4 can be stored in an associated data set.

The method may carry out a target/actual comparison in step S5 in at least some embodiments. Using suitable parameters (for example, tolerances defined beforehand in the scope of the design S1), the correction variables $\Delta$PD determined therefrom can be transferred directly or indirectly (for example, via a database or via the software SW2) to the machine tool 50.

In practice, an individual data set may be managed for each client order, to be able to develop the design, definition, machining, and measuring sequence correctly for production and without confusion. A continuous documentation of relevant process steps S1-S6 is thus ensured simultaneously.

In at least some embodiments, for example, two databases can be used, wherein one of the databases is used for the development data (for example, fG and thG) and the other for the production data PD. The database having development data can be, but does not have to be, connected or connectable to the machine tool 50. The database having the production data PD (i.e., having target data and/or neutral data) may be connected or connectable to the machine tool 50.

The mentioned databases can all, or only in part, be reachable via a network in at least some embodiments.

Further embodiments will be described on the basis of FIG. 1A.

An optional feedback or interaction arrow Ww is shown between the two computers 10.1 and 10.2, or between the software SW1 and SW2, respectively. This arrow Ww indicates that under certain circumstances there can be a type of iteration between steps S1 and S2. This will be illustrated here on the basis of a simple example.

In step S1, a solely theoretical, mathematical observation is performed. Step S2 first provides the relationship to practice. It is therefore entirely conceivable that in step S1 a function-oriented geometry fG is developed, which proves to be not at all producible or not economically reasonably producible in step S2.

Step S2 can now offer a best possible approximation for the planned production. However, if this approximation does not correspond to the expectations, for example, of the client, such an approximation does have to be discarded. In this case, the method can branch back to step S1, to give the user the option of performing corrections on the part of the function-oriented geometry fG.

The method of step S2, which is used to ascertain the theoretically producible geometry thG of the gear wheel Z, can be designed as an iterative method, to enable a user to select a first tool (for example, from the tool database 11 in FIG. 3B) and to ascertain the theoretically producible geometry thG of the gear wheel Z on the basis of tool data WD of this first tool and, if the theoretically producible geometry thG is not suitable, to enable the user to select a second tool and to ascertain the theoretically producible geometry thG of the gear wheel Z on the basis of tool data WD of this second tool, and so on.

Step S2 can also offer the computation of tool data WD of a tool as an option in at least some embodiments. These tool data WD describe a tool which would be optimum or suitable for the machining (step S3) of the gear wheel Z on the basis of the production data PD in the machine tool 50. The user can now use or assemble a tool on the basis of the tool data WD (for example, by grinding bar cutters and equipping a cutterhead with these bar cutters, or dressing a grinding wheel or selecting a dressing tool), or, for example, he can order a corresponding tool from a tool producer.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A method comprising:
   designing and machining a gear wheel including the following steps:
   a) generating function-oriented geometry of the gear wheel using software-based, computer-assisted design,
   b) generating theoretically producible geometry of said gear wheel corresponding to or approximating said function-oriented geometry using at least one software-based, computer-assisted tool,
   c) generating production data representing the theoretically producible geometry,
   d) machining the gear wheel using the production data with a CNC-controlled machine tool,
   e) measuring said gear wheel and generating therefrom a data set of geometry of the machined gear wheel,
   f) comparing the data set to the production data and determining therefrom at least one correction variable, and
   g) one or more of
      generating corrected production data from the production data using the at least one correction variable and machining at least one additional gear wheel using the corrected production data or
      adjusting the machine tool using the at least one correction variable and finish machining said gear wheel with said adjusted machine tool,
   and further comprising iteratively
   h) selecting a machining tool,
   i) performing step b), wherein the step of generating theoretically producible geometry of the gear wheel includes using tool data of said selected tool,
   j) determining suitability of said the theoretically producible geometry, and
   k) when said theoretically producible geometry is not suitable, selecting another machining tool and repeating steps (i), (j), and (k).

2. The method according to claim 1, wherein the step of generating theoretically producible geometry of said gear wheel includes using tool data of at least one machining tool.

3. The method according to claim 1, further comprising: computing tool data for a machining tool suitable for said machining of the gear wheel using the production data.

4. The method according to claim 3, further comprising: selecting a machining tool at least substantially corresponding to the computed tool data.

5. The method according to claim 1, wherein the step of generating theoretically producible geometry of said gear wheel in step b) includes performing a computer-based machining simulation of machining the gear wheel.

6. The method according to claim 5, wherein the computer-based machining simulation defines a cutting simulation.

7. The method according to claim 1, further comprising at least partially repeating step a) after step b) and modifying thereby said function-oriented geometry of the gear wheel.

8. The method according to claim 7, wherein the step of generating production data includes using tool data of an existing machining tool and the machine tool.

9. The method according to claim 8, wherein the production data defines an executable machining strategy for the machining of the gear wheel in step d) in the CNC-controlled machine tool.

10. An apparatus comprising:
    a machine tool including or connectable to a computer or a computer network and configured to execute the following steps:
    designing and machining a gear wheel including the following steps:
    a) generating function-oriented geometry of the gear wheel using software-based, computer-assisted design,
    b) generating theoretically producible geometry of said gear wheel corresponding to or approximating said function-oriented geometry using at least one software-based, computer-assisted tool,
    c) generating production data representing the theoretically producible geometry,
    d) machining the gear wheel using the production data with a CNC-controlled machine tool,
    e) measuring said gear wheel and generating therefrom a data set of geometry of the machined gear wheel,
    f) comparing the data set to the production data and determining therefrom at least one correction variable, and
    g) one or more of
       generating corrected production data from the production data using the at least one correction variable and machining at least one additional gear wheel using the corrected production data or
       adjusting the machine tool using the at least one correction variable and finish machining said gear wheel with said adjusted machine tool,
    wherein the apparatus is further configured to iteratively execute the following steps:
    h) selecting a machining tool,
    i) performing step b), wherein the step of generating theoretically producible geometry of the gear wheel includes using tool data of said selected tool,
    j) determining suitability of said the theoretically producible geometry, and
    (k) when said theoretically producible geometry is not suitable, selecting another machining tool and repeating steps (i), (j), and (k).

11. The apparatus according to claim 10, wherein the step of generating theoretically producible geometry of said gear wheel includes using tool data of at least one machining tool.

12. A non-transitory computer-readable medium having computer-readable instructions stored thereon configured to be installed in or operatively connected to a computer or a computer network, which is connectable to a manufacturing environment comprising at least one machine tool configured for chip-producing machining of a gear wheel and a precision measuring device, wherein the computer-readable instructions, when executed by a computer or computer network, causes execution of the steps of:
    designing and machining a gear wheel including the following steps:
    a) generating function-oriented geometry of the gear wheel using software-based, computer-assisted design,
    b) generating theoretically producible geometry of said gear wheel corresponding to or approximating said function-oriented geometry using at least one software-based, computer-assisted tool,
    c) generating production data representing the theoretically producible geometry,
    d) machining the gear wheel using the production data with a CNC-controlled machine tool, e) measuring said gear wheel and generating therefrom a data set of geometry of the machined gear wheel, f) comparing the data set to the production data and determining therefrom at least one correction variable, and g) one or more of generating corrected production data from the production data using the at least one correction variable and machining at least one additional gear wheel using the corrected production data or adjusting the machine tool using the at least one correction variable and finish machining said gear wheel with said adjusted machine tool, wherein the computer-readable instructions, when executed by a computer or computer network, causes iterative execution of the following steps:

h) selecting a machining tool, i) performing step b), wherein the step of generating theoretically producible geometry of the gear wheel includes using tool data of said selected tool, j) determining suitability of said the theoretically producible geometry, and k) when said theoretically producible geometry is not suitable, selecting another machining tool and repeating steps (i), (j), and (k).

13. The non-transitory computer-readable medium according to claim 12, wherein the step of generating theoretically producible geometry of said gear wheel includes using tool data of at least one machining tool.

* * * * *